Nov. 4, 1924.
C. A. MICHEL
REFLECTOR FOR AUTOMOBILE LAMPS
Filed Jan. 3, 1922.   2 Sheets-Sheet 1
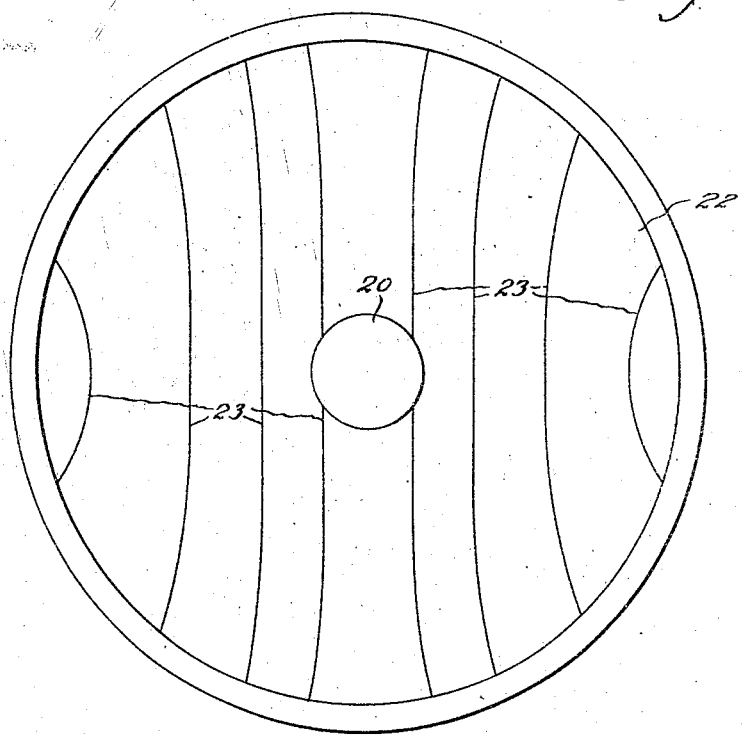
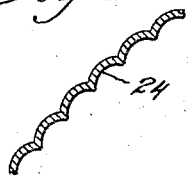
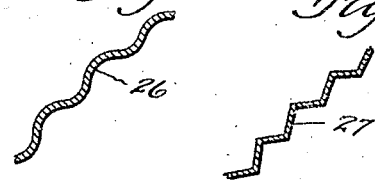
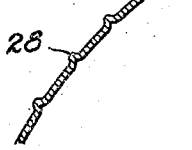
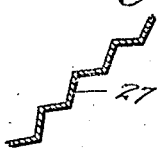

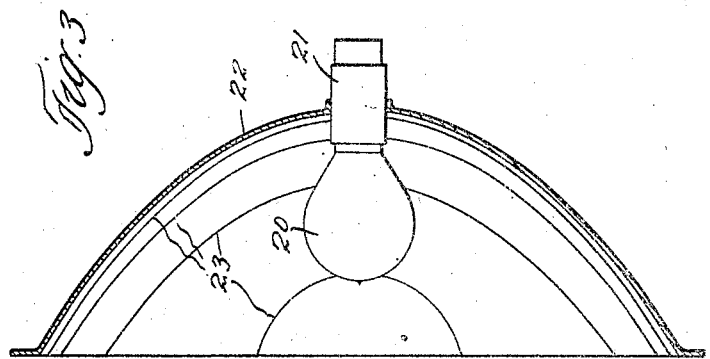
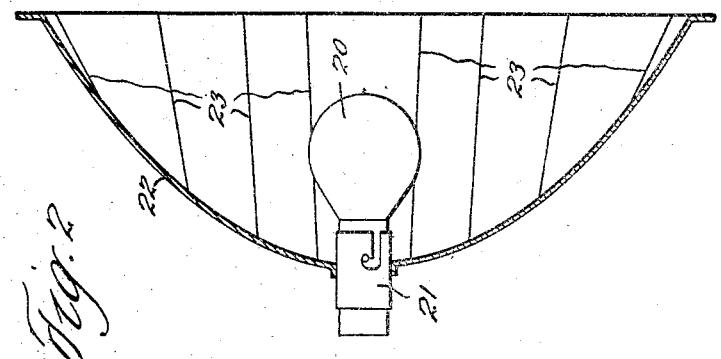

Patented Nov. 4, 1924.

1,513,844

UNITED STATES PATENT OFFICE.

CLARENCE A. MICHEL, OF CLEVELAND, OHIO, ASSIGNOR TO THE GUIDE MOTOR LAMP MANUFACTURING COMPANY, OF CLEVELAND, OHIO, A CORPORATION OF OHIO.

REFLECTOR FOR AUTOMOBILE LAMPS.

Application filed January 3, 1922. Serial No. 526,678.

*To all whom it may concern:*

Be it known that I, CLARENCE A. MICHEL, a citizen of the United States, residing at Cleveland, in the county of Cuyahoga and State of Ohio, have invented a certain new and useful Improvement in Reflectors for Automobile Lamps, of which the following is a full, clear, and exact description, reference being had to the accompanying drawings.

This invention relates generally to automobile headlights and more particularly to a novel construction of reflector used in said lamps, the object being to improve the road illumination by properly spreading the beam of light as it emanates from the lamp.

Various devices have been employed to eliminate the glare in the ordinary automobile headlight and in doing so the proper road illumination has suffered to some extent due to the fact that not enough lateral spread of the beam has been had to give the proper width of road illumination, both close to the car and in advance of the same and the object of the present invention is to overcome this objection and provide a reflector which will give a wide dispersion of the light rays and these widely diverging rays can be controlled by any suitable form of screen to cut out the glare, and without interfering with the lateral spread of the beam.

The invention consists in the novel features of construction hereinafter fully described and pointed out in the claims. In the drawings forming a part of this specification Fig. 1 is a face view of a reflector constructed in accordance with my invention; Fig. 2 is a horizontal sectional view of the same, the lamp being shown in plan; Fig. 3 is a vertical sectional view of the reflector, the lamp being shown in elevation; and Figs. 4, 5, 6, 7, 8, 9 and 10 are detail sectional views showing various ways in which the reflector body can be corrugated, ribbed or fluted.

Referring to the drawings, 20 indicates the source of light which is the ordinary incandescent lamp fixed in the socket 21 and the light is preferably arranged at the focal point of the reflector 22 which is preferably made of sheet metal and may be a conic section or the surface may be generated by a variable parabola, a variable hyperbola, or a variable semi-ellipse, or any combination thereof.

In order to get a lateral divergence of the reflector rays I propose to corrugate, rib or flute the surface of the reflector along lines produced by passing planes through the reflector which planes are oblique to the axis of the reflector but are perpendicular to the roadway.

In this manner a series of corrugations, ribs or flutes 23 can be produced which diverge either outwardly or inwardly and downwardly and also either outwardly or inwardly and upwardly, the corrugations, ribs or flutes being on curved lines as most clearly shown in Fig. 1. By means of a reflector constructed in this manner I am able to get a large amount of lateral spread of the reflected rays and thereby materially improve the road illumination. In Fig. 4 the reflecting surface between the ribs is concaved as shown at 24, and convexed at 25 in Fig. 5, undulating at 26 in Fig. 6, and zigzag at 27 in Fig. 7 and in Figs. 8, 9 and 10 are shown still further modifications with broader surfaces between the ribs or corrugations. In Figure 8 the ribs or corrugations are projected rearwardly as shown at 28 and in Figure 9 they are projected forwardly as shown at 29 and in Figure 10, merely angles 30 are shown and no ribs whatever but the spaces between the ribs in Figures 8 and 9 and between the angles in Figure 10 are wider and flatter than the spaces between the ribs in Figures 4, 5, 6 and 7. It will thus be seen that a large variety of corrugations or ribs can be had but all upon the same general plan; that is, in planes oblique to the reflector axis and perpendicular with the roadway.

Having thus described my invention, what I claim is:

1. In a lamp, a ribbed reflector, the ribs being located in planes which pass obliquely through the axis of the reflector, said planes being perpendicular to a horizontal plane passing through the reflector.

2. In a lamp, a ribbed reflector, the ribs being located in planes which pass obliquely through the axis of the reflector, said planes being perpendicular to a horizontal plane passing through the reflector, said oblique planes converging rearwardly.

In testimony whereof, I hereunto affix my signature.

CLARENCE A. MICHEL.